United States Patent [19]
Fletcher et al.

[11] 3,777,552
[45] Dec. 11, 1973

[54] ULTRASONIC SCANNING SYSTEM FOR IN-PLACE INSPECTION OF BRAZED TUBE JOINTS

[76] Inventors: James C. Fletcher, Administrator of the National Aeronautics and Space Administration with respect to an invention of; Johnny L. Haynes; Charles G. Wages; Hamilton S. Haralson, all of Huntsville, Ala.

[22] Filed: Nov. 9, 1971

[21] Appl. No.: 196,898

[52] U.S. Cl. ............................................. 73/67.8 S
[51] Int. Cl. ............................................ G01n 29/04
[58] Field of Search .................... 73/67.8, 67.8 S, 73/67.9

[56] References Cited
UNITED STATES PATENTS

| | | | |
|---|---|---|---|
| 3,548,641 | 12/1970 | Mitchell | 73/67.9 |
| 3,678,188 | 7/1972 | Okumura | 178/6.6 R |
| 3,121,324 | 2/1964 | Cowan | 73/67.8 S |
| 3,063,290 | 11/1962 | Kaserman | 73/67.8 S |

OTHER PUBLICATIONS
Goldman, Ultrasonic Technology (New York, Reinhold Pub. Co., 1962) p. 262, 263

Primary Examiner—Richard C. Queisser
Assistant Examiner—Arthur E. Korkosz
Attorney—L. D. Wofford, Jr. et al.

[57] ABSTRACT

A miniaturized ultrasonic scanning system for non-destructive in-place, non-immersion testing of brazed joints in stainless-steel tubing. The system is capable of scanning brazed tube joints, with limited clearance access, in 1/4 through 5/8 inch union, tee, elbow and cross configurations. The system has the capability to detect defective conditions now associated with material density changes in addition to those which are dependent upon density variations. The system includes a miniaturized scanning head assembly that fits around a tube joint and rotates the transducer around and down the joint in a continuous spiral motion. The transducer is 0.300 inch diameter focused beam type with a liquid filled rubber tip or boot attached, which provides a simulated immersion test. The scanning head incorporates suitable mechanical drive features, limit switches to control scan travel, and a transmitter to synchronize a facsimile C-scan recorder with the scanning movement. The C-scan recorder is similar in principle to conventional models except that it was specially designed to track the continuous spiral scan of the tube joint. The scanner and recorder can be operated with most commercially available ultrasonic flaw detectors.

5 Claims, 3 Drawing Figures

ULTRASONIC SCANNING SYSTEM FOR IN-PLACE INSPECTION OF BRAZED TUBE JOINTS

ORIGIN OF THE INVENTION

The invention herein was made in the performance of work under a NASA contract and is subject to the provisions of Section 305 of the National Aeronautics Space Act of 1958, Public Law 85–568 (72 Stat. 435; 42 USC 2457).

BACKGROUND OF THE INVENTION

Field of the Invention

This invention relates to ultrasonic tube testing and more particularly to an ultrasonic scanning system for in-place inspection of brazed tube joints.

Nondestructive testing of brazed tube joints in stainless steel tubing has been previously accomplished with radiography. Although X-rays are sensitive to lack-of-braze conditions, that present a density difference, they are not sensitive to "cold braze" or similar conditions where the braze alloy has flowed but not bonded, which do not present a density change on the X-ray film. Ultrasonics has also been applied, but in a limited extent. These are small volume applications where manual and immersion testing techniques are permitted.

Description of the Prior Art

The art of ultrasonic testing of larger manufactured items has developed rapidly in recent years, resulting in a number of usable devices in this field. Several of these prior art devices have been related to the testing of tubes or pipes. However, most of these prior art devices for testing tubes appear to be directed to the testing of longitudinal seams in tubes. Only one prior art device known to the inventors is capable of testing a circumferential seam in a pipe. However, that device employs a rather complex method involving stressing the pipe with a magnetizing coil producing an alternating electric field and then testing the stressed member with an ultrasonic device. That type of prior art device is limited to ferromagnetic materials, which are easily magnetized.

SUMMARY OF THE INVENTION

Accordingly, it is an object of this invention to provide an improved ultrasonic scanning system capable of inspection of brazed tube joints.

It is a further object of this invention to provide a simple ultrasonic scanning system for in-place inspection of circumferential brazed joints in stainless-steel tubing.

It is yet another object of the invention to provide a system for inspection of brazed tube joints capable of locating defects not associated with material density change.

These and other objects are accomplished in the present invention which comprises a scanning head assembly for providing helical scan movement along the tube in the vicinity of the joint to be tested, an ultrasonic flaw detector connected to the scanning head assembly, a recorder connected to the scanning head assembly for providing a developed plan view of the condition of the brazed tube joints to be tested, and an accessory for said recorder (called a dotter) for providing a background of low intensity indicia for the plan view provided by the recorder.

DESCRIPTION OF THE PREFERRED EMBODIMENT

Figure 1:
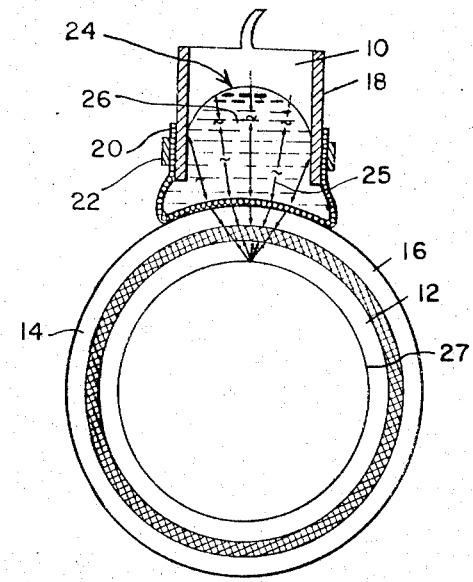
FIG. 1 is a vertical sectional view of the transducer and related elements positioned upon a tube to be tested in the vicinity of a brazed tube joint.

With continued reference to the accompanying figures wherein like numerals designate similar parts throughout the various views and with initial attention directed to FIG. 1, there is illustrated a vertical view of a typical embodiment of part of the invention comprising transducer 10 mounted on tube 12. Sleeve 14 encloses tube 12 and the end of another section of tubing (not shown) and provides a sealed tube joint. Braze line 16 provides a tight seal between sleeve 14 and tube 12. Another similar braze line (not shown) provides a seal between sleeve 14 and the other section of tubing (not shown). Transducer 10 is enclosed by a cylindrical case 18. Flexible boot 20, preferably made of rubber, fits over the end of cylindrical case 18. Sealing band 22 fits over boot 20 so as to hold it tightly against case 18, making a fluid-tight seal. The enclosure 24 created by transducer 10, case 18, and boot 20 is filled with a quantity of ultrasonic fluid 26.

In operation, the invention employs an ultrasonic technique defined as loss of back reflection. High frequency sound energy from the specially designed transducer 10 is focused into the tube 12 under test. The transducer 10 utilizes a liquid-filled rubber boot 20 to simulate an immersion test. The focused wave 25 is transmitted through the contained (and flexible) volume of fluid 26 into the tube joint and is reflected from the inside diameter 27 of the tube. A loss of back reflections from inner diameter 27 of the tube 12 because of a discontinuity in the second path is an indication of a defective brazed area.

Figure 2:
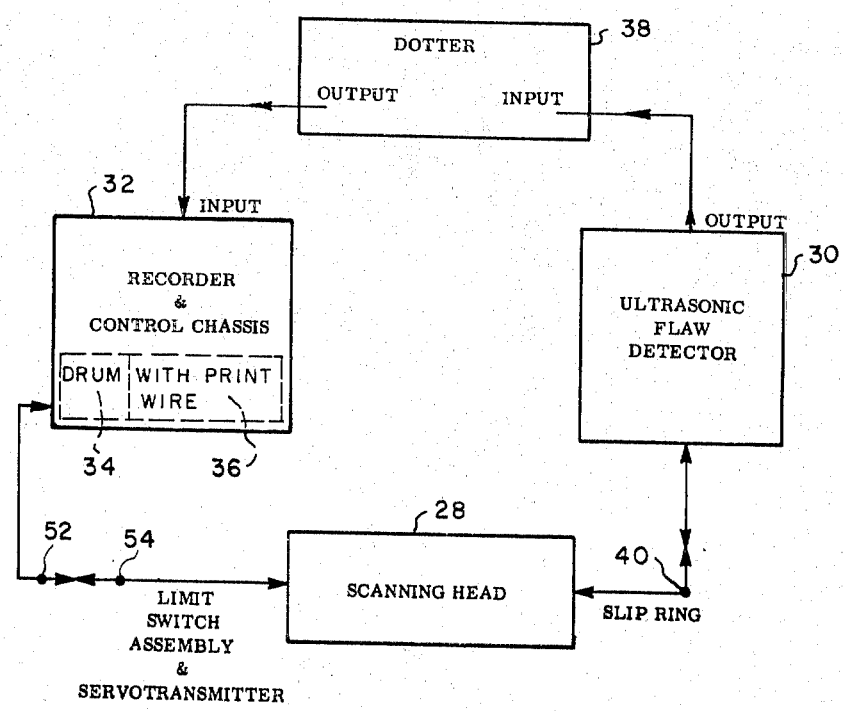
FIG. 2 is a schematic box diagram showing the relationship of certain important elements of the invention.

Looking now at FIG. 2, there is shown a block diagram of the invention. The system incorporates a scanning head assembly 28 for providing helical scan movement along the tube 12 in the vicinity of the joint to be tested. This is accomplished by rotating the transducer 10 in a circumferential motion around the tube joint while traveling down the tube 12 in a longitudinal direction, thus generating a continuous helix pattern. One circumferential revolution corresponds to one x-scan pass, and the travel down the tube is the y- movement or travel, as in conventional x-z scanning modes. The scanning head assembly 28 was designed for a center-to-center distance between circumferential passes of 0.031 inch.

A commercially available ultrasonic flaw detector 30 is connected to scanning head assembly 28. A recorder and control chassis 32, also connected to scanning head assembly 28, provides a developed plan view of the condition of a brazed tube joint to be tested. Recorder 32 is similar to other facsimile recorders in that it contains a drum 34 and a helically wound print wire 36. However, the present invention is not arranged to operate in a convention manner; in the present invention, the drum 34 containing the helically wound print wire 36 rotates continuously in one direction rather than reversing for each x-scan as in y moreover type scanning modes.

A special recorder accessory called a "dotter" 38 is connected to both flaw detector 30 and recorder 32. Dotter 38 increases the resolution of the recordings produced by the invention. The standard state-of-the-art C-scan recording uses a dark background (continuous print). The defective areas are shown by an absence of print (white areas). With this type of recording, small indications are often missed because of a characteristic residue from the dark printing being deposited by the print bar over the white defective area indications. However, with the dotter, the recording area is a series of low-intensity (brown) dashes; defect indications print as dark (black) lines. The brown-dotted background prohibits the residue buildup associated with standard C-scan recordings and results in increased resoluion.

Figure 3:
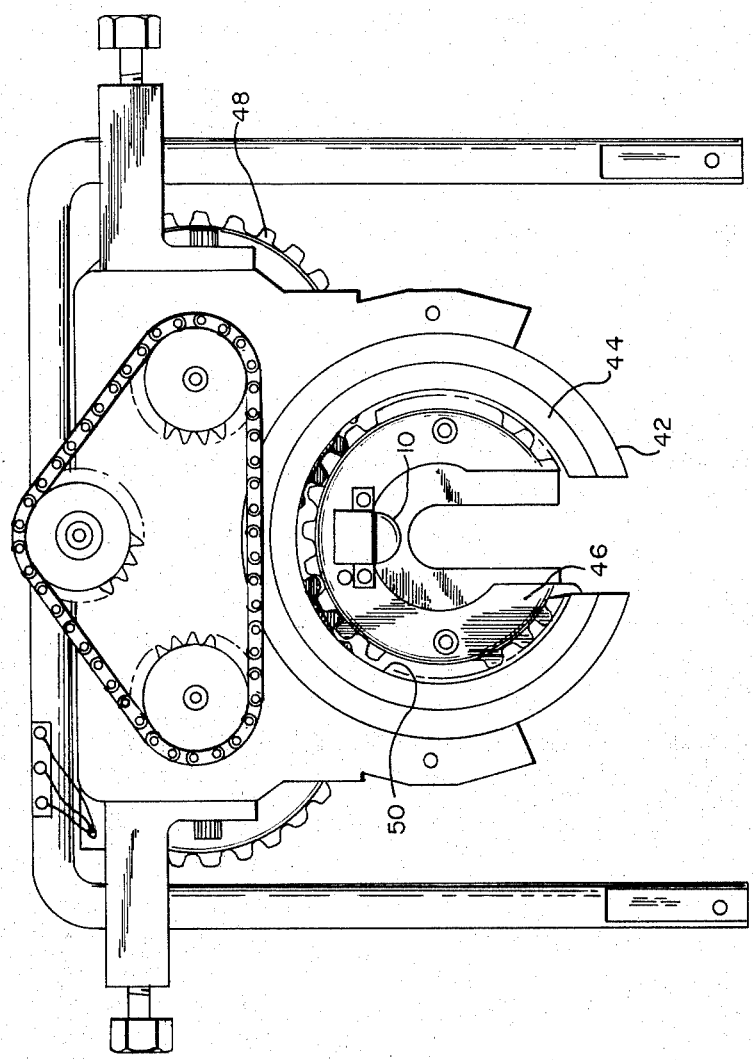
FIG. 3 is a front elevation of the scanning head assembly.

Looking now at FIG. 2 and the drawing of the scanning head assembly 28 shown in FIG. 3, transmit-receive signals flow between transducer 10 and ultrasonic flaw detector 30 by means of slip ring assembly 40. A contact ring and slip ring comprise the assembly 40 that is electrically insulated from the outer case 42, inner case 44, and slug 46. The contact ring is stationary and is electrically connected to the flaw detector 30. The slip ring rotates and is electrically connected to the transducer 10. As the slug 46 rotates, continuous contact is maintained between the contact ring and the slip ring. The transducer 10 is grounded to the slug 46 which completes the electrical circuit.

The drive mechanism inclues the scanning head housing comprising outer case 42, inner case 44, motor (not shown), slug 46, and drive gear 48 to drive the slug 46 at a predetermined design speed. The slug 46 which houses transducer 10 and boot 20, is rotated around the tube 12 while it traverses the tube 12 axially by means of the internal threads 50 of the inner case 44. Limit switches 52 prevent slug 46 overtravel in either direction by reversing the mechanism. The total slug travel is 0.500 inch, which will cover one joint end per scan.

The recorder servotransmitter 54 is an integral part of the scanning head assembly 28. Servotransmitter 54 is a servo unit which "tracks" rotation of the slug 46 around the tube 12 and synchronizes one slug revolution to one "X" pass of the recorder C-scan printout.

In the procedure for setting up the invention, front and rear alignment plates (not shown) are required to position the joint under test in the center of the scanning head assembly 28. Various configurations of the tube joints, such as tees, elbows, crosses, etc. can be successfully tested after the proper alignment plates are attached. To test a tube joint of a particular size and configuration, the proper alignment plates are selected and attached to the scanning head assembly 28. The scanning head assembly 28 is then placed on a "standard" tube joint containing pre-placed defects of known size, and a final adjustment of the alignment plates is accomplished to locate the joint in the center of the scanning head assembly 28. The limit switches 52 are adjusted to provide the required scan coverage, the position of transducer 10 is adjusted for proper focusing, and the ultrasonic instrument is peaked to indicate a defective condition. The scanning head assembly 28 can now accept and test tube joints of the same size as the "standard" joints.

From the foregoing, it may be seen that applicant has invented a novel type of miniaturized ultrasonic scanning system for in-place inspection of brazed tube joints. The system has the capability to detect defective conditions not associated with material density changes in addition to those which are dependent upon density variations. The developed scan system is capable of scanning brazed tube joints, with limited clearance access, in ¼ through 5/8-inch union, tee, elbow, and cross configurations. The average test time for a particular tube size and configuration, after a 30 minute set-up sequence is 3 or 4 minutes. The system is capable of detecting brazing defects as small as 0.008 inch by 0.010 inch. Although the system was designed for nondestructive, in-place, non-immersion testing of brazed joints in stainless-steel tubing, it will be understood by those skilled in the art that the system could also be modified so as to be capable of testing welded joints.

What is claimed is:

1. An ultrasonic scanning system for in-place inspection of brazed tube joints comprising:
    a scanning head assembly having both stationary and moveable portions, for providing helical scan movement along the tube in the vicinity of the joint to be tested;
    an ultrasonic flaw detector connected to said scanning head assembly;
    a recorder connected to said scanning head assembly for providing a developed plan view of the condition of a brazed joint to be tested, said recorder comprising a helically-wound print wire which rotates continuously in one direction;
    an accessory for said recorder connected to both said recorder and said flaw detector for providing a background of low intensity indicia for the plan view provided by said recorder;
    said scanning head assembly comprising:
     a. a transmit-receiver assembly comprising:
      (1) a transducer;
      (2) an enclosure containing said transducer, said enclosure comprising:
       (a) a cylindrical case surrounding said transducer;
       (b) a flexible boot fitting over one end of said case;
       (c) a sealing band fitting over said boot for holding said boot tightly against said case; and
       (d) a quantity of ultrasonic fluid sufficient to fill the portion of said enclosure not filled by said transducer;
      (3) a slip-ring assembly for carrying transmit-receive signals between said transducer and said ultrasonic flaw detector;
     b. a drive mechanism for revolving and translating said transducer along a tube to be inspected in order to generate a continuous helix around the tube; and
     c. a servotransmitter in circuit between said transmit-receiver assembly and said recorder for tracking the revolution of said transducer around the tube and synchronizing one revolution to one "X" pass of the recorder.

2. The ultrasonic scanning system of claim 1 wherein said drive mechanism comprises:
    a cylindrical scanning head housing case, said case containing internal threads, said case having an opening on one side of its circumference said opening running the full length of said case and large enough in width to accept a tube joint, whereby said case may be positioned over and surrounding a tube joint to be tested.

3. The ultrasonic scanning system of claim 2 wherein said drive mechanism comprises:
   a slug mounted inside said scanning head housing case, said slug housing said transducer and said boot, said slug having an opening on one side of its circumference large enough to accept a tube joint, said slug being mounted on said internal threads of said scanning head housing case so that said slug may rotate around a tube joint to be tested while it is traversing the tube joint axially.

4. The ultrasonic scanning system of claim 3 wherein said drive mechanism comprises:
   means to drive said slug at a predetermined design speed.

5. The ultrasonic scanning system of claim 4 comprising:
   at least one limit switch to prevent overtravel of said slug in either direction by reversing said drive mechanism.

* * * * *